(Model.)
F. G. SARGENT.
Wool Washing Machine.
No. 235,901. Patented Dec. 28, 1880.
2 Sheets—Sheet 2.
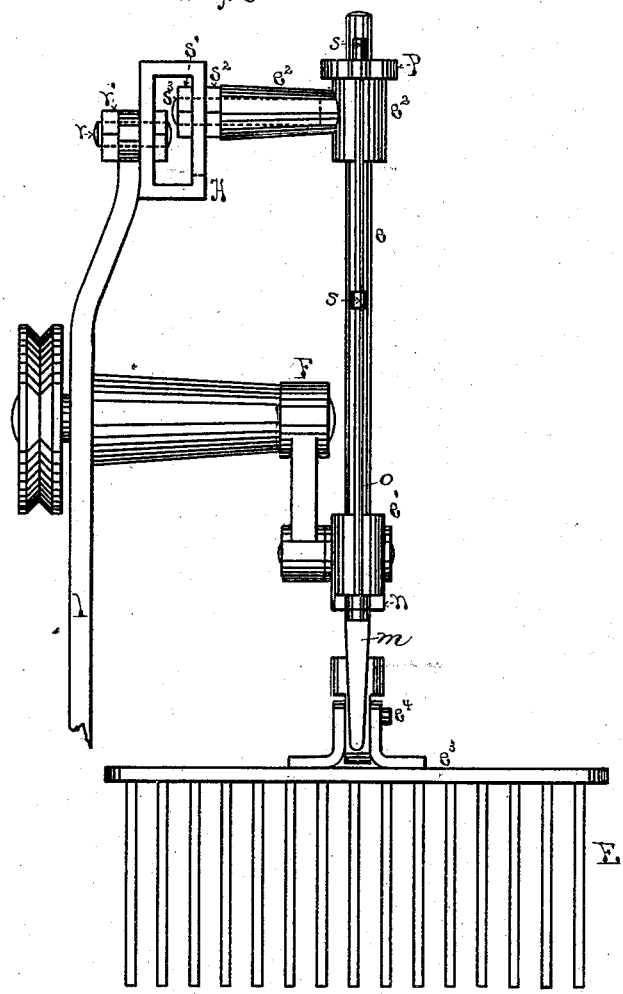

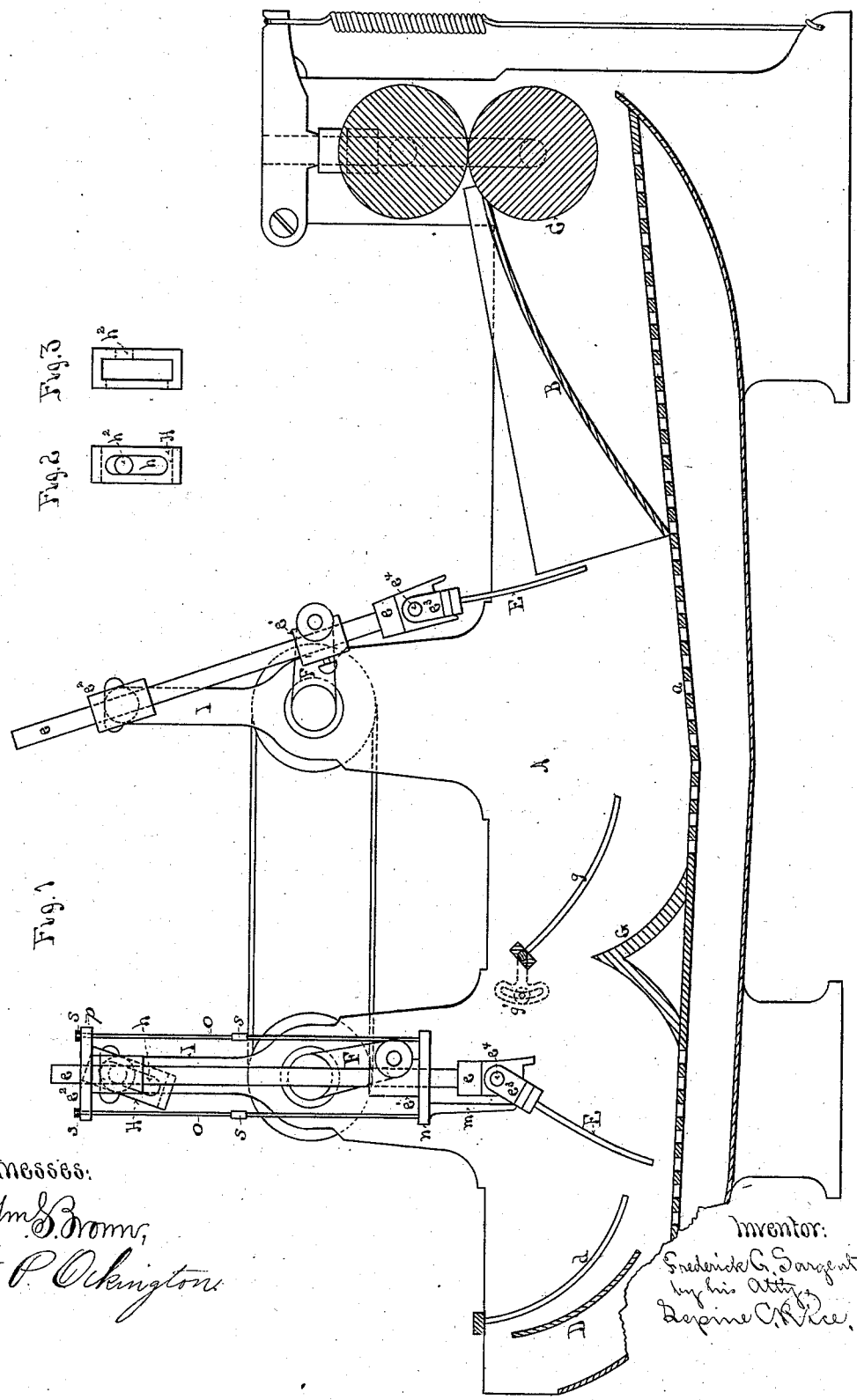

United States Patent Office.

FREDERICK G. SARGENT, OF GRANITEVILLE, MASSACHUSETTS.

WOOL-WASHING MACHINE.

SPECIFICATION forming part of Letters Patent No. 235,901, dated December 28, 1880.

Application filed March 29, 1880. (Model.)

*To all whom it may concern:*

Be it known that I, FREDERICK G. SARGENT, of Graniteville, Massachusetts, have invented a new and useful Wool-Washing Machine, of which the following is a specification.

My invention relates to machines in which the wool is placed in a tank or bowl in a scouring-liquid, in which it is stirred by forks or rakes moved by power for the purpose of scouring or cleansing it; and the objects of my improvements are to so construct the machine and regulate and control the movements of the forks that they will stir the wool in the tank with the least possible expenditure of power and in the most thorough manner, and so that a single fork may act upon the wool for a greater length of time than has heretofore been practical, thus diminishing the number of times which it will be necessary to pass the wool through the machine. I attain these objects by the mechanism illustrated in the accompanying drawings, in which—

Figure 1 is a side elevation with side of the bowl removed; Fig. 2, an elevation showing the same side (seen in Fig. 1) of the link which sustains the rod on which the swivel-sleeve through which the rake-shank passes is placed. Fig. 3 is another view of the same. Fig. 4 is a perspective of the link seen in the other figures. Fig. 5 is a view of the rake and its attachments as seen from the feed end of the machine. Fig. 6 is a view of the link shown in Fig. 2 from the opposite side seen in that figure.

A is the tank or bowl, having the false bottom $a$.

B is the inclined table, up which the wool is taken out of the liquid toward the squeeze-rolls C.

D is a guide-plate placed behind the fixed rake $d$, and extending below the level of the fluid in the tank.

E E are the swinging rakes, which move the wool in the fluid to cleanse it and to pass it forward toward the squeeze-rolls. These rakes are attached to the bifurcated shanks $e$, which pass through the sockets $e'$, which are placed on the pin of the crank F. The shank is held rigidly in the socket $e'$, but can be adjusted so as to extend a greater length below it to alter the sweep of the rake. The shank of the rake slides through the swivel-sleeve $e^2$, which acts as a fulcrum, so that by the movement of the crank a forward movement through the liquid in the tank is obtained, while during the backward movement the rake is suspended and traverses through the air. The shank of the rake is bifurcated, and the rake-head $e^3$ hung between the branches, forming the bifurcation on the pin $e^4$, the object of this arrangement being to allow the prongs or tines of the rake to fall into a more nearly perpendicular position as they are about to enter and leave the wool in the liquid, so that, instead of bearing down the wool toward the bottom of the tank as it floats in the liquid as the rake is swept downward and forward by the movement of the crank, and lifting upon it by the tines as the rake begins its upward movement, it projects its tines into the wool more nearly endwise, and, after moving the wool through the liquid, withdraws them in the same manner, with no tendency to lift upon or tear the saturated fleece or throw any part of it beyond the desired and determined leaving-place by being lifted up on the tines out of the liquid, and then sliding off on the angle of the shank as the rake leaves the liquid, as sometimes occurs when the tines are at all times kept in line with the staff $e$.

G is a partition placed in the tank midway between the sweep of the rakes, and extending from the bottom to near the surface of the liquid in the tank. Above and forward of this partition is placed an adjustable rake, $g$, which can have its tines set at any angle desired by the adjusting device $g'$, to permit a greater or less quantity of wool to pass under it from one rake to another, as may be desired.

If it be desirable to have the tines of the swinging rake yield and fall back more at one part of the movement than at another when meeting with equal resistance, the rear branch, $m$, of the bifurcated shank is made movable and attached to a cross-head, $n$, sliding upon the shank of the rake, and adjusted so as to be withdrawn from behind the rake, at such time as it is desired, sufficiently to allow the rake-head to obtain the required position. This adjustment is effected by the guide-rods $o$ $o$, which are attached to the cross-head $n$, and slide in a guide-rod plate, P, attached to the swivel-sleeve $e^2$. On the sliding guide-rods $o$ are placed collars or stops $s\,s$, the lower one of which, coming in contact with the guide-plate P as the rake-staff is lifted by the crank, depresses the branch $m$ behind the rake-head $e^3$, and as the crank F moves downward the branch $m$, cross-head $n$, rods $o$, and shank $e$ all fall together, until the collars $s\,s$, near the top of the rods, come in contact with the guide-plate P, when, the cross-head $n$ and branch $m$ being prevented from moving, the further movement downward of the rake-shank withdraws the branch $m$ from behind the head $e^3$ and permits the rake to swing back. As the collars $s$ can be adjusted, the branch may be drawn back as little or much as is desired, and the rake-head can consequently be allowed to fall back more or less, as may be necessary for the work being done. By thus allowing the rake-tines to fall back the wool can be permitted to remain a considerable time in one division or section of the tank before being taken by the next fork or carrier while being moved by each stroke of the rake, thus more thoroughly washing or scouring it than if passed immediately from one fork to another and onward to the squeeze-rolls. The sweep of the rakes and the angle the rake-tines make with the fluid in the tank as they leave it can be altered and regulated by changing the position of the swivel-sleeve $e^2$ by moving the stud $s^3$, Fig. 5, on which it is swiveled, either horizontally or perpendicularly. The link H is provided with hole $h^2$, through which the bolt $r$ passes, and the standard I, extending up from the side of the bowl, is provided with a slotted hole, $f$, through which the bolt $r$ also passes, and the link H is held firmly in position on the standard I by the binding-nut $r'$. In the opposite side of the link H is the slotted hole $h$, through which the stud $s^3$, on which the swivel-sleeve $e^2$ moves, extends. This stud is provided with the collar $s^2$, by means of which and the binding-nut $s'$ the stud is held in the slotted hole $h$. By loosening the binding-screws $r'$ and $s'$ the stud $s^3$ can be placed in any position desired, above or below the hole $f$ in the front or rear of standard I, giving with each change a new line of movement to the rakes E, and therefore greatly facilitating the adjustment of the machine, so that the desired described results may be obtained.

The operation of the machine may be thus described: The wool is fed in by the attendant behind the guide-plate D and pushed under the plate, when, rising, it will be prevented from coming to the surface by the fixed rake $d$, and the fluid will have time to displace the air in the mass. As the crank F revolves the rake E is brought over, and its tines, passing between those of the rake $d$, will catch some of the wool and carry it forward from under the rake $d$ toward the partition G; but as the rake E, first taking the wool, swings back on the pin $e^4$, a small quantity will not be pushed over the partition G far enough to be taken by the second rake, but will slide back into the liquid as the fork returns for another lot of wool. When, however, the accumulated masses of wool are sufficient to fill the space between the first rake and the partition G the rake will crowd over the partition with each movement a quantity about equal to that which it brings forward from under the fixed rake $d$. By this means it will be observed that the wool is kept for some time in the first division of the bowl, being agitated by each movement of the rake while it soaks in the liquid; and it will be observed that if the rake-head were not allowed to swing on the shank, so as to allow the tines of the rake to be withdrawn endwise, or very nearly so, instead of swinging around in the arc of a circle, it would not be possible to so retain the wool in the tank without injury and without great loss of power, caused by the lifting upon so large a saturated mass by the ends of the fork-tines as they described such an arc. The passage of the wool over the partition G is still further controlled by the adjustable rake $g$, by placing its tines more or less nearly parallel to the surface of the liquid in the tank. After the passage of the wool over the partition the second rake forwards it toward the squeeze-rolls, operating in substantially the same manner as does the first rake.

What I claim as new and of my invention is—

1. The combination of the tank A, bifurcated shank $e$, and rake-head $e^3$, swinging between the arms of the bifurcated shank, substantially as described.

2. The combination of the rake-head $e^3$ and shank $e$, provided with the bifurcated end, one branch of which can be moved parallel to the shank of the rake, substantially as described.

3. The combination of the tank A, fixed guide-plate D, and stationary rake $d$, substantially as described.

4. The combination of the tank A, the two swinging rakes, E E, and the partition G, substantially as described.

5. The combination of the tank A, two swinging rakes, E E, partition G, and adjustable rake $g$, substantially as described.

FREDERICK GRANDERSON SARGENT.

Witnesses:
 ARTHUR B. PLIMPTON,
 LEPINE C. RICE.